United States Patent
Otto

[11] Patent Number: 6,050,570
[45] Date of Patent: Apr. 18, 2000

[54] SEAL WITH BI-MODULUS LIP

[75] Inventor: Dennis L. Otto, Malvern, Ohio

[73] Assignee: The Timken Company, Canton, Ohio

[21] Appl. No.: 09/016,113

[22] Filed: Jan. 30, 1998

[51] Int. Cl.[7] .............................. F16J 15/32; F16J 15/447
[52] U.S. Cl. ........................ 277/351; 277/560; 277/569
[58] Field of Search ................................. 277/549, 559, 277/560, 562, 569, 351

[56] References Cited

U.S. PATENT DOCUMENTS

| | | |
|---|---|---|
| 2,804,324 | 8/1957 | Stallings . |
| 2,932,535 | 4/1960 | Peickii et al. . |
| 3,495,843 | 2/1970 | Andersent et al. . |
| 3,523,692 | 8/1970 | Otto . |
| 3,838,862 | 10/1974 | Fern . |
| 4,171,561 | 10/1979 | Bainard et al. . |
| 4,239,243 | 12/1980 | Bainard et al. . |
| 4,300,777 | 11/1981 | Symons . |
| 4,311,316 | 1/1982 | Cather, Jr. . |
| 4,613,143 | 9/1986 | Butler . |
| 4,667,968 | 5/1987 | Nash et al. . |
| 4,770,548 | 9/1988 | Otto ........................................... 277/562 |
| 4,822,058 | 4/1989 | Butler et al. ............................. 277/569 |
| 4,867,926 | 9/1989 | Matsushima . |
| 4,969,653 | 11/1990 | Breen . |
| 5,013,052 | 5/1991 | Butler et al. . |
| 5,022,659 | 6/1991 | Otto . |
| 5,129,744 | 7/1992 | Otto et al. ................................. 277/562 |
| 5,458,420 | 10/1995 | Otto ........................................... 277/562 |
| 5,577,741 | 11/1996 | Sink . |
| 5,813,675 | 9/1998 | Otto ........................................... 277/562 |
| 5,887,875 | 3/1999 | Salciccioli et al. ...................... 277/562 |

*Primary Examiner*—Anthony Knight
*Assistant Examiner*—John L. Beres
*Attorney, Agent, or Firm*—Polster, Lieder, Woodruff & Lucchessi, LLC

[57] ABSTRACT

A seal for separating a viscous lubricant, such as grease, from contaminants in the surrounding environment, includes case having axial and radial walls, a shield located in the case and also having axial and radial walls, a primary seal element attached to the radial wall of the case and establishing two fluid barriers along the axial wall of the shield, and a secondary seal element attached to the radial wall of the shield and establishing another fluid barrier along the axial wall of the case. The primary seal element includes a labyrinth which is spaced slightly away from the axial wall of the shield and contains pumping cavities which drive the lubricant away from the primary seal element when relative rotation exists between the primary seal element and the shield. The primary seal element also has a contact lip provided with inside and outside beveled surfaces which converge toward a band along which the contact lip bears against the axial wall of the shield. The primary seal element is for the most part molded from an elastomer, but it contains an insert having a higher modulus of elasticity than that of the elastomer. The inside beveled surface, which is presented toward the labyrinth, lies along the insert as does the adjoining region of the band. The outside beveled surface lies along the elastomer as does the adjoining region of the band. The seal is particularly effective under frigid conditions when grease may not migrate to the band on the contact lip to lubricate it.

19 Claims, 2 Drawing Sheets

SEAL WITH BI-MODULUS LIP

BACKGROUND OF THE INVENTION

This invention relates in general to seals and, more particularly, to a seal having a lip with two moduli of elasticity along its band of contact.

The typical antifriction bearing operates with its interior isolated from the surrounding environment by a seal fitted to the bearing itself or located immediately beyond it. The seal not only retains the bearing lubricant within the interior of the bearing, but it also excludes contaminants which might detract from the effectiveness of the lubricant or actually damage the rolling elements and raceways of the bearing.

Most seals have at least one lip which bears against a cylindrical sealing surface to establish a dynamic fluid barrier along that surface. To prevent the seal from abrading or overheating, a small amount of lubricant should lie under its lip, that is between the lip and the sealing surface. In a seal operated under moderate climatic conditions, the lubricant tends to migrate along the sealing surface and provide the lubrication for preserving the seal lip. But when a seal is operated under extremely frigid conditions, the lubricant does not flow easily, if at all, and the seal lip experiences excessive wear. Indeed, grease becomes solid at low temperatures, and when in that condition, it will not adequately lubricate a seal lip. The solid grease, however, provides adequate lubrication for the antifriction bearing itself, because the rolling elements fracture it and churn it. The churning elevates the temperature of the grease enough to render it viscous, and in that condition it provides adequate lubrication for the bearing itself.

Others have experimented with seals having two moduli of elasticity in their contact lips. The portion of the seal lip formed with the lower modulus, is usually an elastomer, and it deflects under shear forces to more effectively pump lubricants. Hence, the elastomer with the lower modulus is typically located on the lubricant side of the seal, leaving the material of higher modulus in the contaminant side. It does not pump contaminants away from the seal very well. Often the material having the high modulus is polytetrafluoroethylene (PTFE).

BRIEF SUMMARY OF THE INVENTION

The present invention resides in a seal having a case and a primary seal element that is formed primarily from an elastomer, but contains an insert formed from a durable low friction material having a higher modulus of elasticity. The primary seal element has a lip formed by two beveled surfaces which converge toward a band along which the lip contacts a sealing surface. The insert lies along the beveled surface on the lubricant side of the seal and further lies along the adjoining region of the band. The other beveled surface and the region of the band which adjoins it lies along the elastomer from which the remainder of the seal element is formed.

BRIEF DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

Figure 1:
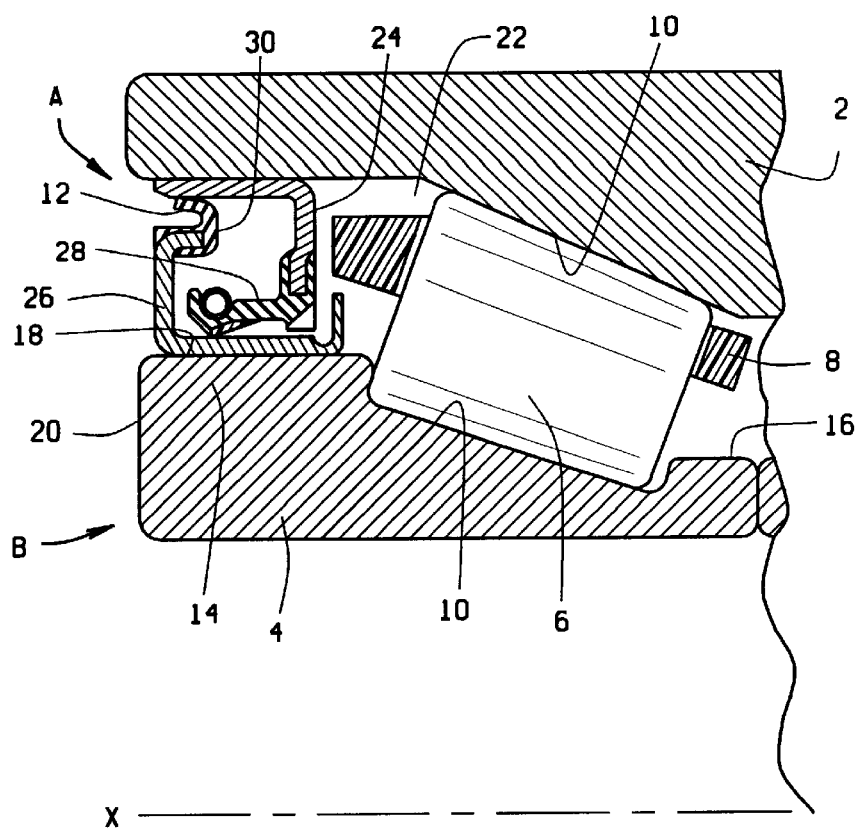
FIG. 1 is a sectional view of a tapered roller bearing fitted with a seal constructed in accordance wit and embodying the present invention.

Referring now to the drawings, a seal A fits into the end of an antifriction bearing B to close that end of the bearing B and thereby isolate the interior of the bearing B from the surrounding environment (FIG. 1). This retains a lubricant, which is normally grease, in the interior of the bearing B and excludes contaminants, such as water and dirt The bearing B, in turn, fits between a housing and shaft, enabling one to rotate relative to the other about an axis X of rotation, which is, of course, the axis of the bearing B.

The bearing B, which is conventional, includes (FIG. 1) an outer race in the form of a cup 2, an inner race in the form of a cone 4, and rolling elements in the form of tapered rollers 6 which lie in a row between the cup 2 and the cone 4. In addition, the bearing A has a cage 8 into which the rollers 6 fit, and it serves to maintain the proper spacing between the rollers 6 as well as to retain the rollers 6 around the cone 4 when the cone 4 is withdrawn from the cup 2. The rollers 6 contact the cup 2 and the cone 4 along opposed raceways 10. Basically, line contact exists between the side faces of the rollers 6 and the raceways 10. The raceways 10 and the side faces of the rollers 6, if extended to their respective apices, would have those apices located at a common point along the axis X.

At its large end the cup raceway 10 merges into a cylindrical end bore 12 which opens out of end of the cup 2. The cone 4, on the other hand, has a thru rib 14 at the large diameter end of its raceway 10 and a retaining rib 16 at the small diameter end. The thrust rib 14 lies within the end bore 12 of the cup 2. The large ends of the tapered rollers 6 bear against the thrust rib 14, and indeed the thrust rib 14 prevents the rollers 6 from being expelled from the bearing A. The thrust rib 14 has a cylindrical mounting surface 18 that is presented outwardly away from the axis X and ends at a back face 20 which is squared off with respect to the axis X. The retaining rib 16 at the small end of the cone raceway 10 cooperates with the cage 8 to hold the rollers 6 around the cone 4—indeed along the cone raceway 10—when the cone 4 is withdrawn from the cup 2.

The raceways 10 of the cup 2 and the cone 4 create an annular space 22 (FIG. 1), which represents the interior of the bearing B, and this space 22 opens out of the end of the bearing A through the end bore 12 of the cup 2 and around the mounting surface 18 on the cone thrust rib 14. In short, the end bore 12 and mounting surface 18 lie at, and form the end of, the space 22.

The seal B closes the end of the annular space 22 (FIG. 1), and thus retains the lubricant for the bearing A in that space 22 and excludes contaminants from it. Actually, the seal A fits into the end bore 12 of the cup 2 and around the thrust rib 14 of the cone 4, providing live or dynamic barriers in this region.

The seal A includes (FIGS. 1 and 2) a case 24 which fits into the end bore 12, another case or shield 26 which fits around the cone thrust rib 14, a primary seal element 28 which is bonded to the case 24 and establishes two dynamic barriers along the shield 26, and a secondary seal element 30 which is bonded to the shield 26 and establishes a dynamic fluid barrier along the case 24. The case 24 and shield 26 are generally rigid, being formed preferably as metal stampings. The seal elements 28 and 30 are formed primarily from elastomers and are flexible.

The case 24 includes (FIG. 2) an axial wall 32, which fits within and along the end bore 12 of the cup 2, and a radial wall 34, which is directed radially inwardly from the axial wall 32. The diameter of the axial wall 32 slightly exceeds that of the end bore 12, so that an interference fit exists between the case 26 and the cylindrical surface of the end bore 12. Hence, one must press the case 26 into the end bore 12. The interference fit creates a static fluid barrier between the case 26 and cup 2. The radial wall 34 is offset from the end of the cup 2 and, while being directed toward the cone thrust rib 14 which lies within the end bore 12, terminates short of that thrust rib 14, so that a space of moderate size exists between the inner margin of the radial wall 34 and the cylindrical mounting surface 18 on the thrust rib 14.

That mounting surface 18 serves to position and support the shield 26. Like the case 24, the shield 26 includes (FIG. 2) an axial wall 36 and a radial wall 38. The axial wall 36 lies along the mounting surface 18 of the thrust rib 14, and indeed an interference fit exists between the two. During installation of the seal A in the bearing B, the axial wall 36 of the shield 26 is pressed over the mounting surface 18 of the cone thrust rib 14. This establishes a static fluid barrier between the shield 26 and the cone 4. The radial wall 38 projects outwardly from the axial wall 36 toward the axial wall 32 of the case 26 and obscures the radial wall 34 of the case 24. The radial wall 38 of the shield 26 forms the exposed end of the seal A. It is separated from the radial wall 34 of the case 26, and the space between the two radial walls 34 and 38 forms a annular cavity. At its opposite end the axial wall 36 of the shield 26 merges into a flange 40 which is directed radially outwardly such that the case 24 and primary seal element 28 are captured between the ends of the shield 26. Between the radial wall 38 and the flange 40 the axial wall forms a sealing surface along which the seal element 28 establishes fluid barriers.

In addition to the axial wall 36, the radial wall 38, and the flange 40, the shield 26 has a shortened axial wall 42 (FIG. 2) which extends from the radial wall 38 at the periphery of the wall 38 such that it encircles the axial wall 36. The outer axial wall 42, however, lies within the axial wall 32 of the case 24. It projects toward the radial wall 34 of the case 24, but terminates considerably short of it.

Figure 2:
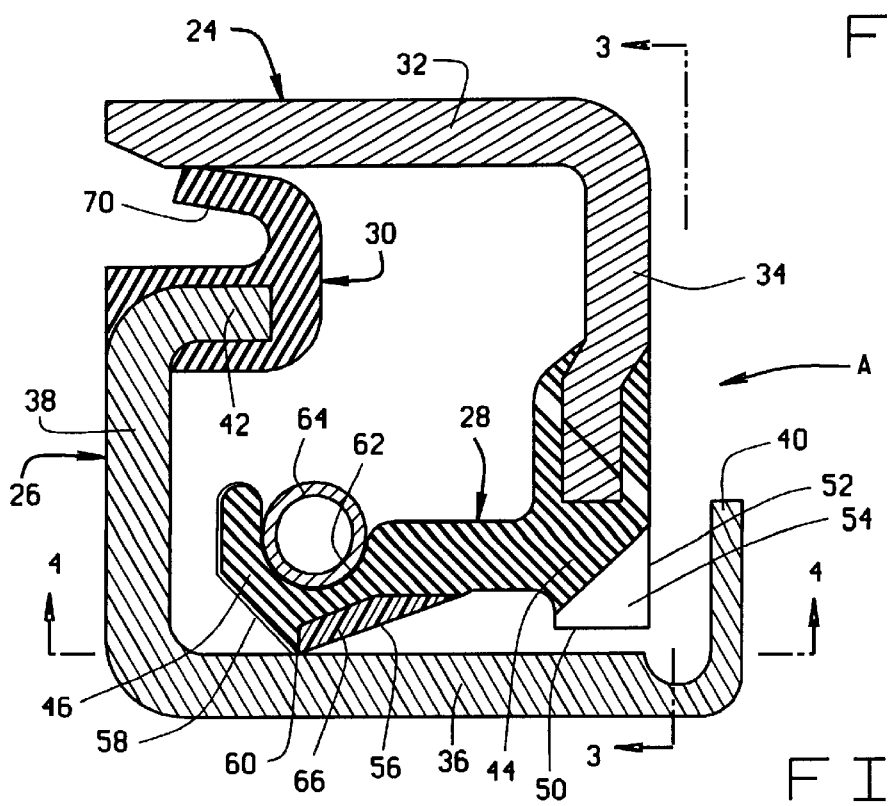
FIG. 2 is an enlarged sectional view of the seal.

The primary seal element 28 is bonded to the radial wall 34 of the case 24 and projects inwardly from the case 24 toward the inner axial wall 36 of the shield 26 (FIG. 2). In this region, the seal element 28 has two formations, one a pumping labyrinth 44 and the other a contact lip 46. Each establishes a dynamic fluid barrier along the axial wall 36 of the shield 26.

Figure 3:
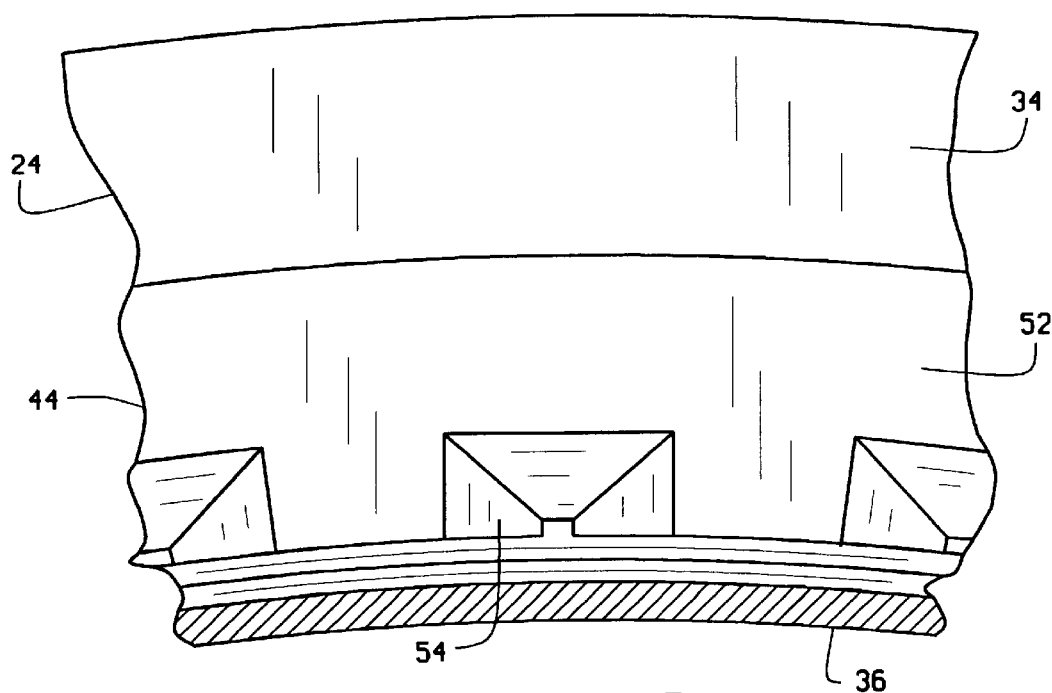
FIG. 3 is a fragmentary end view of the seal lip taken along line 3—3 of FIG. 2.

The pumping labyrinth 44 (FIGS. 2–4) encircles the inner axial wall 36 of the shield 26 near the radial flange 40 of the shield 26, but does not contact the axial wall 36. It has a generally cylindrical surface 50 which encircles and is presented toward the inner axial wall 36 of the shield 26, but is spaced outwardly from that surface, so that a gap exists between the surface 50 and the axial wall 36. The gap should be between 0.005 and 0.035 inches. The labyrinth 44 also has an end surface 52 which is directed radially and is presented toward the flange 40 of the shield 26 and toward the large ends of the rollers 6. Finally, the labyrinth 44 contains pumping cavities 54 which are wedge-shaped and open out of both the cylindrical surface 50 and the end surface 52, their largest cross-sectional areas being at the surfaces 50 and 52.

The contact lip 46 projects generally axially away from the labyrinth 44 and has two beveled surfaces 56 and 58 which converge toward an edge in the form of a band 60 along which the lip 46 actually contacts the inner axial wall 36 of the shield 26. The inside surface 56, which is closest to the labyrinth 44, lies at a shallower angle with respect to the axis X than the outside surface 58. The lip 46 is molded such that the diameter of the band 60 is slightly less than the outside diameter of the inner axial wall 36 on the shield 26, so that the band 60 contacts the inner wall 36 along the fill circumference of the wall 36. On its opposite face, the contact lip 46 has an annular groove 62 of arcuate cross-section which opens radially outwardly. The groove 62 lies generally behind the band 60, although its center is offset slightly toward the labyrinth 44, and it contains a garter spring 64 which tends to contract the lip 46 and urge its band 60 against the inner axial wall 36 of the shield 26.

Figure 4:
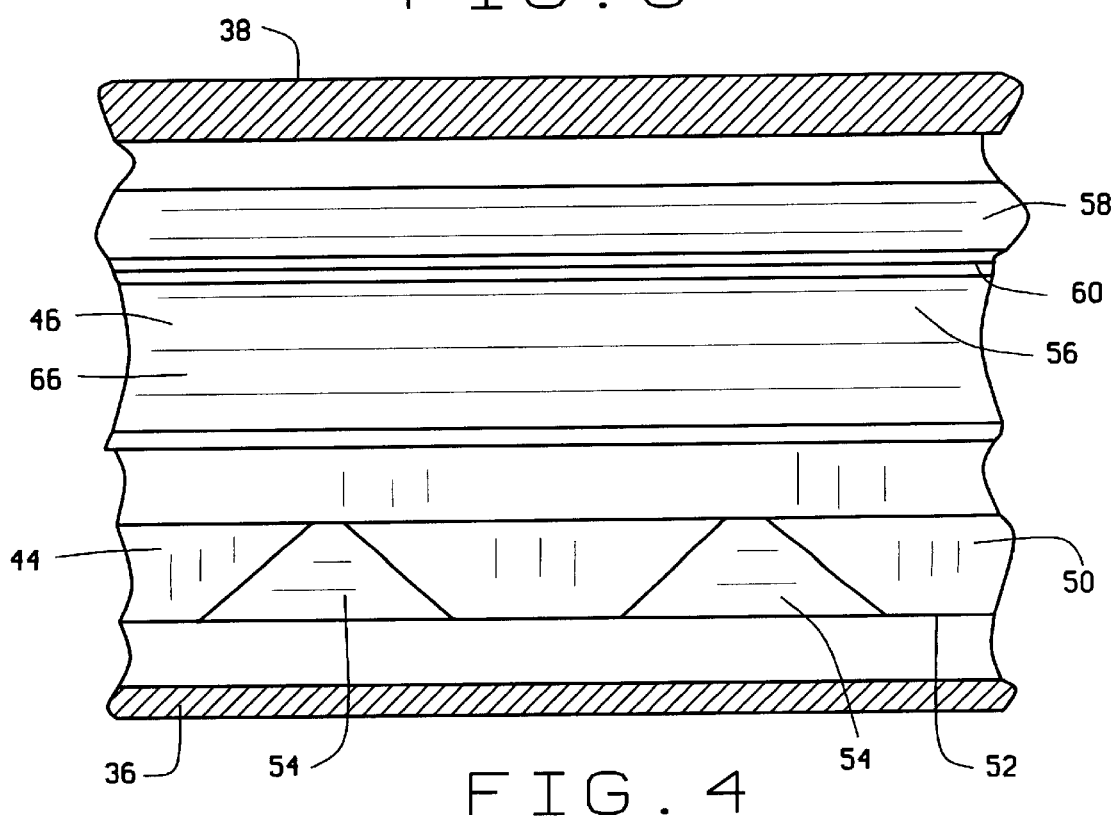
FIG. 4 is a fragmentary view of the primary seal lip taken along line 4—4 of FIG. 2 and showing the surfaces where the primary lip establishes dynamic fluid barriers.

The primary seal element 28 is for the most part molded from an elastomer having a uniform modulus of elasticity, but it contains an insert 66 formed from a material having a higher modulus of elasticity than the elastomer and preferably a low coefficient of friction against steel. Polytetrafluoroethylene (PTFE), which is sold under the trademark TEFLON by E.I. duPont de Nemours and Company of Wilmington, Del., is a suitable material for the insert 66. The insert 66 is embedded within the contact lip 46 where it is presented toward the labyrinth 44 such that almost the entire surface 56 lies along it Moreover, the insert 66 extends into the band 60 such that a portion of the band 60 lies along the insert 66 and the remainder lies along the elastomer from which the seal lip 46 is otherwise molded (FIG. 4). When relative rotation occurs between the lip 46 and the axial wall 36 of the shield 26, the elastomer along the band 60 and outside beveled surface 58 deflects somewhat relative to the insert 66. By reason of this deflection, the elastomer effects a pumping action which is directed away from the band 60.

The secondary seal element 30 (FIG. 2) is molded from an elastomer having a uniform modulus of elasticity. It is bonded to the shield 26 along the periphery of the radial wall 38, with the outer axial wall 42 being embedded in it. The seal element 30 has a lip 70 which is directed backwardly over the outer axial wall 42, although it lies oblique to the axis X. The lip 70 bears against the axial wall 32 of the seal case 24, establishing a dynamic fluid barrier along that wall.

In operation, the seal A retains grease or some other lubrication within the bearing B, that is within the space 22 between the two raceways 10, and further prevents contaminants, such as water and dirt, from entering the space 22. Moreover, it operates effectively at all temperatures and does not experience excessive wear under frigid conditions when grease becomes solid. The contaminants may also take the form of oil when the seal is used to separate oil from grease as some truck axles require.

The tapered roller bearing B in operation inherently pumps grease up the raceways 10, which is good since it directs that grease against the thrust rib 14 where it is needed most However, beyond the thrust rib 14 the grease encounters the labyrinth 44 on the seal element 28. The pumping cavities 54 in the labyrinth 44, owing to their wedge-shaped configuration, deflect the grease back toward the rollers 6 and the space between the raceways 10. As their name implies, the pumping cavities 54 actually pump the grease, and in so doing they move the grease to where it is needed most, that is to where the end faces of the rollers 6 slip and spin along the thrust rib 14. However, when the bearing B comes to rest, a small amount of grease will seep through the gap between the labyrinth 44 and the axial wall 36 of shield 26, provided the grease is sufficiently fluent in this region to flow, and that to a large measure depends on the temperature of the shield 26 and labyrinth 44 at the time. The grease which does seep past the labyrinth 44 migrates on to the contact lip 46. Owing to its inclination, the beveled surface 56 tends to direct or pump this grease underneath the band 60 along which the contact lip 46 bears against the inner axial wall 36 of the shield 26. Actually, the grease forms a thin film between the band 60 and inner axial wall 36, and this film supports the contact lip 46 on the axial wall 36.

Under extremely frigid conditions, when grease solidifies, the inner axial wall 36 of the shield 26 may be too cold for the grease to migrate along it, even though the grease remains viscous in the space between the raceways 10 owing to the churning imparted by the rollers 6. But the absence of sufficient grease at the band 60 does not cause significant deterioration of the contact lip 46, because the contact lip 46 is supported against the inner axial wall 36 along the end of the high modulus insert 66 which is embedded in the elastomer of the contact lip 46. The insert 66 has a low coefficient of friction with the steel of the axial wall 36 and is quite durable. It experiences relatively little wear, notwithstanding the load imposed on the lip 46 by the natural resiliency of the elastomer from which it is molded and the additional load imparted by the garter spring 64.

Contaminants, on the other hand, initially encounter the contact lip 70 of the elastomeric seal element 30 and few penetrate the fluid barrier established by the lip 70 along the axial wall 32 of the seal case 24. The lip 70 relies on the resiliency of the elastomer from which it is molded to maintain contact with the axial wall 32 of the seal case 24, and is not loaded as heavily as the contact lip 46 of the seal element 28. Therefore, in spite of having very little grease to lubricate it, the lip 70 does not experience significant wear.

Contaminants which do pass beyond the lip 70 of the seal element 30 enter the annular cavity between the radial walls 34 and 38 of the case 24 and shield 26, respectively. These contaminants may eventually encounter the contact lip 46 on the primary seal element 28. The outside beveled surface 58 of the lip 46, by reason of its inclination, will tend to direct fluent contaminants toward and beneath the band 60 along which the lip 46 bears against the inner axial wall 36 of the shield 26, but this pumping effect is offset by the tendency of the elastomeric portion of the lip 46 to deform and pump fluids away from the band 60 of the lip 46. In this regard, the modulus of elasticity for the elastomer from which the seal element 28 is molded is low enough to enable the lip 46 to deflect slightly under the shear force generated by the friction between it and the axial wall 36 of the shield 26. After all, both the low modulus elastomer that forms the major portion of the lip 46 and the high modulus material of the insert 66 lie along band 60. The lower modulus elastomer deflects at the band and outside beveled surface 58, owing to the shear forces, and the lip 46 in this region pumps contaminants away from the band 60 with greater effectiveness than the inclination of the surface 58 directs contaminants toward the band 60.

While the seal A which is depicted actually fits in the end of the bearing B, it may also fit between housing and a shaft to which the bearing B is fitted. One rotates relative to the other by reason of the bearing B being between them. In such an arrangement, the seal A could lie beyond the bearing B, yet close to its end. In any event, the seal A fits between two machine components, one of which rotates relative to the other, and those machine components could take the form of the cup 2 and cone 4 or a housing and shaft to which the cup 2 and cone 4 are fitted. Also, the sealing surface need not be on the shield 26, but may be a cylindrical surface on the cone 4 or the shaft to which it is fitted.

This invention is intended to cover all changes and modifications of the example of the invention herein chosen for purposes of the disclosure which do not constitute departures from the spirit and scope of the invention.

| Parts List SEAL WITH BI-MODULUS LIP | |
|---|---|
| B | bearing |
| A | seal |
| X | axes of rotation |
| 2 | cup |
| 4 | cone |
| 6 | rollers |
| 8 | cage |
| 10 | raceways |
| 12 | end bore |
| 14 | thrust rib |
| 16 | retaining rib |
| 18 | mounting surface |
| 20 | back face |
| 22 | annular space |
| 24 | case |
| 26 | shield |
| 28 | primary seal element |
| 30 | secondary seal element |
| 32 | axial wall |
| 34 | radial wall |
| 36 | axial wall (inner) |
| 38 | radial wall |
| 40 | flange |
| 40 | flange |
| 42 | axial wall (outer) |
| 44 | pumping labyrinth |
| 46 | contact lip |
| 50 | cylindrical surface |
| 52 | end surface |
| 54 | pumping cavities |
| 56 | beveled surface |
| 58 | beveled surfaces |
| 60 | band |
| 62 | annular groove |
| 64 | garter spring |
| 66 | insert |
| 66 | insert |
| 70 | lip |
| 70 | |

What is claimed is:

1. In combination with first and second machine components between which an annular space exists, with the space containing a viscous lubricant in the form of grease, one of the machine components being capable of rotating relative to the other component about an axis of rotation, there being along the second machine component a sealing surface which lies generally parallel to the axis and beyond the annular space, a seal for isolating the annular space, said seal comprising: a case fitted to the first machine component and a flexible seal element attached to the case, the seal element including a contact lip having inside and outside beveled surfaces located oblique to the sealing surface and a band toward which the beveled surfaces converge, with the band being located along and against the sealing surface, the inside beveled surface being presented toward the annular space and the outside beveled surface being presented away from the annular space, the inside beveled surface being at a lesser angle to the sealing surface than the outside beveled surface, the seal element being formed primarily from an elastomer along which the outside beveled surface and an adjoining region of the band lie, the sealing element containing an insert formed from a material having a higher modulus of elasticity than the elastomer, with the inside beveled surface and an adjoining region of the band being on the insert, whereby differing moduli of elasticity exist along the band.

2. The combination according to claim 1 wherein the seal element also includes a formation which lies along the sealing surface between the contact lip and the annular space and establishes a fluid barrier to the movement of the lubricant along the sealing surface.

3. The combination according to claim 2 wherein the formation is spaced radially from the sealing surface so that a slight gap exists between the formation and the sealing surface, whereby the formation creates a labyrinth along the sealing surface.

4. The combination according to claim 3 wherein the formation is configured to pump the lubricant away from it.

5. The combination according to claim 3 wherein the formation has an axially directed surface which is presented toward the sealing surface and an end surface which is presented toward the annular space; and wherein the formation contains wedge-shaped cavities which open out of the axially directed surface and the end surface and are configured to pump lubricant, which encounters them, generally axially away from the seal element and back toward the annular space.

6. The combination according to claim 3 wherein the case includes an axial wall which fits into the first machine component and a radial wall to which the seal element is attached.

7. The combination according to claim 6 wherein the first machine component is the outer race of an antifriction bearing and the second machine component is the inner race of the same bearing.

8. The combination according to claim 3 wherein the seal element contains an annular groove that is located generally behind the band and opens away from the sealing surface; and further comprising a garter spring in the groove for urging the band against the sealing surface.

9. The combination according to claim 1 wherein the insert is formed from polytetrafluoroethylene.

10. A seal for establishing a fluid barrier around an axis of rotation, said seal comprising: a rigid case located around the axis; a rigid shield located generally within the case and having an axially directed wall located around the axis; a primary seal element attached to the case and including a formation that encircles the axial wall of the shield and establishes a first fluid barrier along the axial wall and a contact lip that bears against the axial wall and establishes a second fluid barrier along the wall, the contact lip having inside and outside beveled surfaces that are located oblique to the axial wall and coverage toward a band along which the lip bears against the wall, the inside beveled surface being presented generally toward the formation and the outside beveled surface being presented away from the formation, the inside beveled surface being located at a lesser angle to the axial wall of the shield than the outside beveled surface, the seal element being molded from an elastomer and including an insert that is embedded within elastomer, with the insert having a higher modulus of elesticity than the elastomer the outside surface and an adjoining region of the band being along the elastomer, the inside beveled surface and an adjoining region of the band being along the insert, whereby differing moduli of elasticity exist along the band.

11. A seal according to claim 10 wherein the formation has an axial surface which presented toward the axial wall of the shield but has a diameter greater than the axial wall of the shield so that a gap exists between the formation and the axial wall of the shield.

12. A seal according to claim 11 wherein the formation also has an end surface which is presented away from the contact lip and at a substantial angle with respect to the axial wall of the shield.

13. A seal according to claim 12 wherein the formation contains cavities that open out of its axial surface and its end surface and are configured to pump a lubricant away from the formation and the contact lip when relative rotation occurs between the primary seal element and the shield.

14. A seal according to claim 11 wherein the included angle between the outside beveled surface on the contact lip and the axial wall of the shield is greater than the included angle between the inside beveled surface and the axial wall of the shield.

15. A seal according to claim 11 wherein the case has a generally radially directed wall and the primary seal element is attached to the radially directed wall in the region of the formation and the band on the contact lip is located remote from the radially directed wall.

16. A seal according to claim 15 wherein the case includes an axially directed wall to which the radially directed wall is connected, and the shield includes a radially directed wall to which its axially directed wall is connected, with the radially directed wall of the shield being presented toward, yet spaced from the radially directed wall of the case.

17. A seal according to claim 16 and further comprising a secondary seal element attached to the shield at its radially directed wall, the secondary seal element being formed from an elastomer and having a lip which bears against the axial wall of the case to form a third fluid barrier.

18. A seal according to claim 10 wherein the insert is formed from poyletrafluoroethylene.

19. A seal according to claim 10 and further comprising a film of grease between the band and the axial wall of the shield.

* * * * *